Aug. 3, 1965     H. W. ALYEA ETAL     3,198,421

CAPACITY CONTROLLED COMPRESSED FLUID SOURCE

Filed Jan. 30, 1963

INVENTORS.
HAROLD W. ALYEA
WILLIAM P. CHAPMAN
EDWARD D. JURASINSKI
BY
Andrus & Starke
ATTORNEYS United States Patent Office 3,198,421
Patented Aug. 3, 1965

3,198,421
CAPACITY CONTROLLED COMPRESSED
FLUID SOURCE
Harold W. Alyea, Waukesha, and William P. Chapman and Edward D. Jurasinski, Milwaukee, Wis., assignors to Johnson Service Company, Milwaukee, Wis., a corporation of Wisconsin
Filed Jan. 30, 1963, Ser. No. 255,005
2 Claims. (Cl. 230—21)

This invention relates to a capacity controlled compressed fluid source for supplying a compressed fluid to a storage unit or the like for subsequent use in a control system and particularly in a system where maintenance of operation is extremely important and the reliability of the equipment is of paramount importance.

The present invention is applicable to any compressor having a moving compressing means or element in a working chamber for receiving any compressible fluid and after compressing thereof delivering the compressed fluid to a storage unit. In present practice, air is almost universally employed in control systems and piston type air compressors are employed to maintain a supply of compressed air for operating the system. The present invention is therefore hereinafter particularly discussed and described as applied to an air compressor and a compressed air operated system for clarity and simplicity of explanation.

Automatic pneumatic control systems employing compressed air have been made which are extremely satisfactory from the standpoint of cost, life and reliability for most industrial control application. Such systems are widely employed to regulate variables such as temperature, pressure humidity, and flow in air conditioned spaces, industrial processes and the like.

The pneumatic control system employs compressed air which can be supplied from any suitable source and is customarily supplied from a piston type air compressor. A compressed air storage tank is connected to the output of the air compressor and holds a supply of compressed air at a pressure considerably above that required by the system. A pressure reducing valve connects the storage tank to the system and establishes an essentially constant control pressure in the system in the presence of variations of tank pressure.

The air compressor is selected with a capacity substantially greater than that of the normal demands of the system in order to provide a compressor having a useful practical life. Because of the variableness of the air useage in the control system, some means must be provided to match the compressor operation to demands of the system. Two very common methods are an intermittent compressor drive and an intermittent compressor loading.

In the intermittent compressor drive method, a pressure-actuated switch is controlled by the storage tank pressure and connected to control the energization of the compressor drive motor. When a predetermined tank pressure is reached, the switch opens to stop the compressor operation. When the pressure in the storage tank drops to a predetermined level, normally substantially above that of the system operating pressure, the switch again closes to energize the motor and start the compressor.

In the intermittent compressor loading method, the storage tank pressure is employed to control the loading and unloading of the compressor which is driven continuously. A control valve is connected to control the operation of the compressor intake valve. If the pressure in the storage tank is above a predetermined level, the control valve is actuated to hold the compressor intake valve open. As a result, the compressor is held unloaded. When the tank pressure drops, the compressor intake valve is again closed to load the compressor and build up the pressure in the storage tank. In this method, the compressor capacity is thus varied between 100% and zero without any interruption in the mechanical operation of the compressor.

In either method, however, accessory controls are provided for interrupting the effective operation of the compressor unit. Such accessory devices are all mechanical devices having certain failure rates. The failure rate of the complete air source system is the sum of the failure rates of the individual components. Although relatively reliable pressure control units are available for controlling the operation of the compressor in accordance with the pressure of the storage tank, the additional components necessarily increase the overall failure rate of the system.

In the intermittent compressor drive method, the pressure-electric switch may fail, mechanically or electrically. An overriding safety valve must be provided on the storage tank to protect against failure of the pressure-electric switch in the closed position. For example, if the contact points fuse together, the compressor is driven continuously and dangerous pressures may be established within the storage tank if a safety valve is not provided. Further, the starting and stopping of the motor will result in a more rapid wear or destruction of the motor than a continuous running.

In the method of intermittent compressor loading, the unloading valve or the cylinder unloader can fail mechanically. Additionally, the storage tank must have a safety valve, as in the intermittent drive method, which can fail mechanically.

As a result, the overall failure rate of the system is increased by such additional control components.

Further, efficiency of a compressor changes with use due to wear of the operating components in the compressor. As a result, the working operation of the compressor is increased through the pressure control system to compensate for such decreased efficiency. This further tends to increase the failure of this complete system.

The present invention is particularly directed to a very simple and reliable mechanical control unit for increasing substantially the reliability of the compressed air system or source for automatic control systems and the like. The increased reliability of the apparatus of the present invention is obtained by the elimination of the accessory control components interconnecting the storage tank to the operation of the compressor.

In accordance with the present invention, the compressor is provided with a controlled enlarged clearance; that is, the space for the air between the head of the piston and the compressor working chamber. The maximum output pressure of a compressor is directly related to the clearance and by proper control the output of the compressor is set at the maximum storage tank pressure. Consequently, the output of the compressor may be connected directly to the storage tank. The compressor operates continuously and the life of the motor is substantially increased. At the selected maximum pressure, the capacity of the compressor automatically becomes zero and consequently it can be connected directly to the tank without any necessity for safety valves or pressure responsive switches associated with the tank for controlling the compressor.

Generally, in accordance with the present invention, an auxiliary control chamber is connected to the working end of the compressor cylinder. A movable piston or the like in the auxiliary control chamber determines the operating clearance and may be adjusted to provide the desired total operating clearance within the limits of the volume of the control chamber. This permits adjustment for tolerances and variations in standard compressors so that all of a single line are readily adjusted to produce a similar output curve. A standard line of compressors could also be adapted to meet different requirements by adjustment of the compressor clearance to obtain an infinite variety of output curves from any given unit. After selected operation, the output curve may vary due to wear of the compressor. The clearance volume may be adjusted to increase the efficiency and compensate for such wear.

In accordance with a very important and novel aspect of the present invention, the control chamber piston or other volume varying means is resiliently urged to a minimum clearance position as by a suitable pre-loading means; for example, a spring or the like. During the initial pump-up period and abnormal air usage periods, the clearance piston is held at minimum clearance such that the compressor operates at maximum volumetric efficiency. As the pressure increases however the clearance piston would gradually move against the preloading means and increase the clearance until a balance between the pre-loading means and the compressor is established. The adjustment of the strength of the spring or other pre-loading means would determine the pressure at which the balance would occur and thereby determine the maximum output pressure. The pre-loading means would be set such that the compressor capacity would balance the system requirements.

As the clearance control piston would be alternately subjected to maximum and minimum compressor output pressures as the compressor piston moves from its intake to its discharge position, the control spring is selected to balance the mean pressure. The minimum pressure during the piston stroke is generally at or just slightly below atmospheric and is essentially constant. The mean pressure therefore varies in proportion to the maximum pressure.

The system would also automatically compensate variations in the compressor operation, such as wear of components in the compressor and temperature or barometric changes of the air at the intake. Thus, as the efficiency of the compressor decreases, the mean pressure decreases. This decreases the compressor pressure applied against the pre-loading means of the clearance chamber. The pre-loading means reduces the volume of clearance and thereby increases volumetric efficiency.

The present invention thus provides a highly reliable compressed air source employing a very minimum number of components. The present invention further provides a simple means for controlling the output curve of the compressor and further a means for automatically or manually adjusting for wear and decreased volumetric efficiency of a given compressor. The present invention may be readily applied to the standard existing compressors.

The drawing furnished herewith illustrates the best mode presently contemplated for carrying out the invention.

Figure 1:
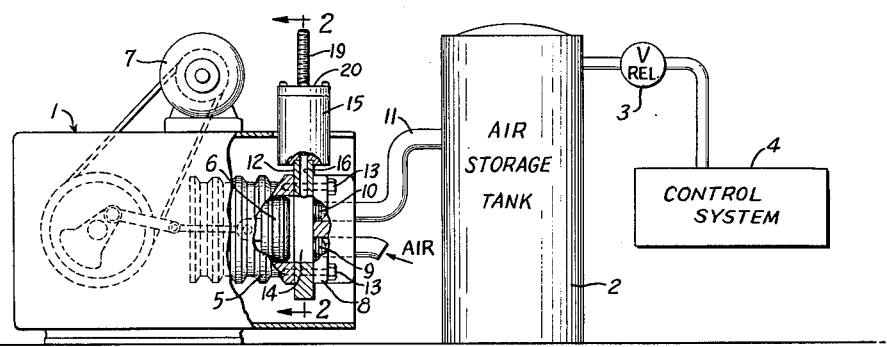
FIG. 1 is a diagrammatic view of a compressed air control system including an air compressor constructed in accordance with the present invention.

Referring to the drawing and particularly to FIG. 1, an air compressor 1 of the piston type is shown having an outlet line connected to a storage tank 2. A pressure reducing valve 3 connects the outlet of the storage tank 2 to an automatic control system 4, shown in block diagram for purposes of simplicity and clarity of explanation of the present invention. Generally, the control system 4 may be employed to regulate temperature, pressure humidity, flow or any other variable in an air conditioning or industrial process or the like. Generally, such control systems as heretofore designed have employed a pressure of 15 to 20 pounds per square inch gauge (hereinafter abbreviated as p.s.i.g.) and the storage tank 2 is maintained at a substantially higher pressure which may vary between 50 and 85 p.s.i.g.

The illustrated air compressor 3 includes a compressor cylinder block 5 having a cylinder chamber within which a piston 6 is slidably disposed. An induction motor 7 or the like is coupled to drive the piston 6 at a contant speed and at a constant displacement. The top position of piston 6 corresponds generally to the outer face of the cylinder block 5. The outer end of the cylinder block 5 is closed by a cylinder head 8 having an air inlet valve 9 communicating with the atmosphere and an air outlet valve 10. Inlet valve 9 connects the cylinder or piston chamber to atmospheric or sub-atmospheric air which is drawn into the cylinder on the backstroke of the piston 6. When the piston moves toward the cylinder head 8, the air inlet valve 9 closes. The air within the cylinder is compressed until it reaches approximately dead end at which time the outlet valve 10 opens to discharge the air into the storage tank 2 through the conduit 11.

Figure 2:
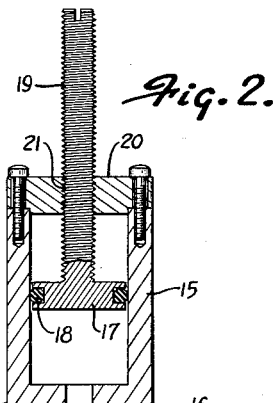
FIG. 2 is a sectional view of the compressor taken on line 2—2 of FIG. 1.

In accordance with the embodiment of the present invention shown in FIGS. 1 and 2, a clearance control ring 12 is interposed between the cylinder head 8 and the outer end or working end of the cylinder block 5 with suitable securing bolts 13 or the like passing through the cylinder head 8 and the clearance control ring 12 into the cylinder block 5. The clearance control ring 12 establishes a clearance pocket 14 between the inner surface of the cylinder head 8 and the piston 6 when the latter is at the end of the working or air compressing portion of the compressor cycle.

A small clearance control cylinder 15 has a substantially closed inner end which is secured within a suitable recess in the outer peripheral edge of the clearance control ring 12, as most clearly shown in FIG. 2. A connecting passageway 16 is provided through the clearance control ring 12 and the integral closed end of the cylinder 15 to interconnect clearance pocket 14 with the interior of the cylinder 15. A clearance control piston 17 is slidably disposed within the cylinder 15. The outer peripheral edge of the piston 17 is grooved with a resilient O-ring seal 18 disposed therein slidably and rotatably engaging the wall of the cylinder to provide a air-tight seal about the piston 17. A piston rod 19 is shown integrally formed on the back edge of the control piston 17 and projecting outwardly through an outer closure cap 20 which is bolted or otherwise releasably fixed to the outer end of the cylinder 15. Piston rod 19 is formed with a continuous screw thread and is threaded through a correspondingly tapped opening in cap 20. Turning of the piston rod 19 axially positions the piston 17 within the cylinder 15 to control the total clearance added to that of the clearance pocket 14.

The operation is summarized for an assumed operation with the storage tank 2 maintained at a minimum pressure of 50 p.s.i.g. and a maximum pressure of 85 p.s.i.g. The size of the compressor is preferably selected such that with the minimum pressure in the tank 2, the compressor capacity equals the maximum air demands of the system.

The motor 7 drives the compressor 1 continuously. The piston rod 19 is threaded through the opening 21 to properly position the clearance control piston 17 for establishment of a predetermined total clearance in accordance with the maximum pressure to be established in tank 2. When the pressure reaches a predetermined maximum value; for example, 85 p.s.i.g., the pressure at the top of the stroke of piston 6 is equal to the tank pressure and at the bottom of the stroke is equal to or slightly above the suction pressure so that no additional air is introduced through the inlet valve 9 nor does air pass from the compressor 1 to the storage tank 2. In summary, the capacity of the compressor 1 at the predetermined discharge pressure is zero.

In practice, the actual demands of control systems usually vary by a ratio of two to one and the pressure of tank 2 will vary between the minimum pressure of 50 p.s.i.g. and about 65 p.s.i.g.

The present invention thus eliminates a number of components and particularly the various pressure responsive controls heretofore employed in compressed air sources for control systems and the like. As a result, the failure rate of the complete air source system is substantially improved and the reliability correspondingly increased.

The present invention allows compensation for wear of the compressor components, such as piston rings or the like. If the piston rings wear, air leakage past the piston results in a reduction in the volumetric efficiency. In order to compensate for this reduced efficiency, the clearance control piston can be moved inwardly to reduce the clearance volume and as a result, the volumetric efficiency increased to the predetermined or desired level.

The invention illustrated in FIGS. 1 and 2 reduces the volumetric efficiency of the compressor to provide the simple and reliable pressure control system. The invention as shown in FIGS. 1 and 2 would therefore be particularly applicable where compressor failure means are of such consequences that maximum reliability is required without substantial consideration being given to efficiency. For example, in missile flights and the like where a compressor failure would mean complete loss of missile control, the reliability of the control system is paramount. In many industrial control applications, a more reasonable incident of failure can be tolerated and the present invention would thus be particularly applicable to those industrial applications requiring a very high degree of reliability.

Figure 3:
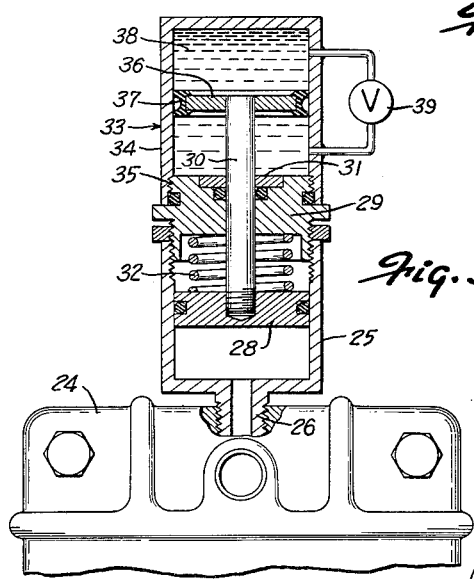
FIG. 3 is an end elevational view of an air compressor with a clearance control unit shown in section and showing a second embodiment of the present invention.
Figure 4:
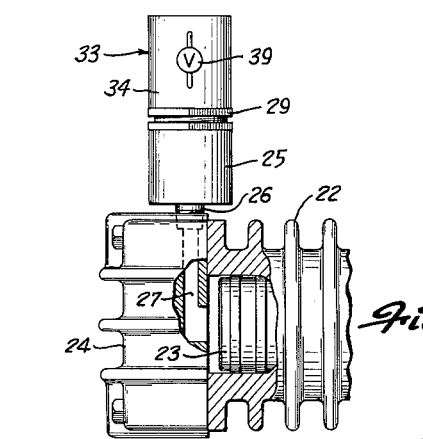
FIG. 4 is a fragmentary side elevational view of the compressor shown in FIG. 3.

However, referring particularly to FIGS. 3 and 4, an alternative embodiment of the invention is shown including a means to automatically vary the clearance volume to compensate for a number of variables that affect the actual tank pressure maintained by the compressor and to provide improved volumetric efficiency during the pump-up period. These variables that affect the tank pressure and for which this alternative embodiment provides automatic compensation include a decrease in compressor efficiency due to wear, an increase in air usage, and changes in the temperature or barometric pressure of the air at the compressor intake.

The compressor as such is basically similar to that of the previous embodiment and is hereinafter described to the extent necessary to clearly and fully describe and set forth the improvement shown therein.

The compressor of FIGS. 3 and 4 includes a compressor cylinder 22 having a piston 23 slidably disposed therein and driven in any suitable manner. A cylinder head 24 having suitable air inlet and air discharge valves, not shown, is secured directly to the cylinder 22 to close the piston chamber without an intermediate clearance control ring or the like as in the previous embodiment.

In accordance with the embodiment of the invention of FIGS. 3 and 4, a control cylinder 25 is provided having a tubular projection 26 which is threaded into a correspondingly threaded opening in the side or top of the cylinder head 24. Passage 27 is provided in the head 24 communicating and extending between the control cylinder 25 and the compressor cylinder 22.

A clearance control piston 28 is slidably disposed within the cylinder 25. A closure cap 29 is threaded into the outer end of cylinder 25 and a smooth surfaced piston rod 30 connected to the back side of piston 28 is slidably journaled through a liquid-sealed opening 31 in the cap 29. A coil spring 32 encircles the rod 30 between the back side of the piston 28 and the inner surface of the cap 29. The coil spring 32 is under compression and continuously urges the piston 28 forwardly toward the mounting projection 26 to establish a minimum compressor clearance.

The spring 32 balances the pressure on the piston 28 in the clearance cylinder 25 when the compressor capacity corresponds to the system air requirements. As shown in FIG. 3, the closure cap 29 can be threaded into and out of the cylinder to adjust the position of outer end of the spring 32 and thereby adjust the compression and force of spring 32 for any given position of piston 28.

The clearance piston spring 32 initially forces the clearance piston 28 to the position of minimum clearance. When the compressor is operated, a minimum clearance is initially presented and the compressor operates at maximum volumetric efficiency. As the discharge pressure increases in the working or piston chamber of the compressor, the clearance piston 28 is gradually moved outwardly against the spring 32. The clearance increases until a balance is established between the forces of spring 32 and of the compressor.

In operation, the clearance piston 28 is alternately subjected to the maximum and minimum pressures within the compressor cylinder 22 as the compressor piston 23 moves through one complete stroke. The coil spring 32 is selected therefore to balance the mean pressure of the compressor and to position the piston accordingly. The minimum pressure of the compressor during the piston stroke is nearly constant, being at or just slightly below atmospheric in accordance with customary practice. As a result, the mean pressure varies directly in proportion to variations in the maximum pressure and the setting of the coil spring 32 to counterbalance the mean pressure establishes proper functioning of the system.

A hydraulic damping unit 33 is secured to the piston rod 30 of the clearance control piston 27 and includes a cup-shaped housing 34 having the open end threaded onto the outer end of the cap 29 as at 35. A damping piston 36 is secured to the outer end of the piston rod 32 and is provided on the periphery with a grooved sealing ring 37 which engages the wall of the housing 35 to prevent oil leakage thereby. Housing 35 is filled with an oil 38 which is allowed to pass to the opposite sides of the piston 36 through a flow control valve or orifice 39. The restricted movement of piston 36 dampens the movement of control piston 28 and essentially prevents oscillation of the clearance control piston 28 with the reciprocating movement of the compressor piston 23.

In the illustrated embodiment of FIGS. 3 and 4, the clearance control ring 12 has been completely eliminated and control cylinder 25 connected through the cylinder head 24 provides complete clearance control. As a result, when the spring 32 holds the piston 28 against the head of the control cylinder 25, a very minimum clearance is provided and the compressor operates at maximum capacity. As the pressure within compressor cylinder 22 increases due to operation of the compressor, the control piston 28 is forced outwardly against the force of spring 32 until a balance between the spring pressure and the mean pressure of the compressor is established.

The latter method of clearance control provides a somewhat greater latitude of adjustment in the output curve than that of FIGS. 1 and 2. Further, the use of a separate and single control adjustment cylinder allows modification of a standard compressor merely by the provision of a suitable opening in the cylinder head to which the clearance cylinder is attached. Where such modification is made, it is clear that the manually adjusted piston of the embodiments of FIGS. 1 and 2 or the automatically positioned piston of FIGS. 3 and 4 could be employed as desired.

In summary, the present invention provides an exceedingly reliable compressed air source for control and regulating systems. Such high reliability is the direct result of eliminating the accessory pressure sensitive controls in prior sources of compressed air.

Various modes of carrying out the invention are contemplated as being within the scope of the following claims particularly pointing out and distinctly claiming the subject matter which is regarded as the invention.

We claim:
1. A pressure control unit adapted to be connected to a compressor having a cylinder and a removable head, comprising
 (a) a clearance ring having opposite end faces corresponding to the end faces of the head and the cylinder for clamping therebetween,
 (b) a clearance control chamber secured to the clearance ring, said ring having a radial opening providing communication to the chamber and to the inside of the ring and thereby the cylinder, and
 (c) presettable means to fixedly adjust the effective volume of the clearance control chamber to a constant clearance and thereby vary the volumetric efficiency of the compressor and the maximum out pressure.
2. The pressure control unit of claim 1 wherein said presettable means to vary the effective volume of the clearance control chamber comprises,
 (a) a control piston slidably disposed within the chamber, and
 (b) a piston rod secured to the control piston and releasably adjustably secured to the chamber for selective fixed positioning of the control piston independently of the compressor operation.

References Cited by the Examiner

UNITED STATES PATENTS

| | | | |
|---|---|---|---|
| 1,154,798 | 9/15 | Palmer | 230—21 |
| 1,740,967 | 12/29 | Buehler | 230—21 |
| 1,856,460 | 5/32 | Blank | 230—21 |
| 1,901,817 | 3/33 | Neidl | 230—237 |
| 1,918,882 | 7/33 | Witkiewicz et al. | 230—21 |
| 1,951,558 | 3/34 | Nystrom | 230—238 |
| 1,985,642 | 12/34 | Moody | 230—21 |
| 1,997,476 | 4/35 | Wallene | 230—21 |
| 2,008,809 | 7/35 | Wyld | 230—21 |
| 2,047,167 | 7/36 | Heller | 230—21 |
| 2,197,158 | 4/40 | Saharoff | 230—21 |
| 2,570,965 | 10/51 | Meyers | 230—21 |
| 2,854,187 | 9/58 | Crooks | 230—21 |
| 2,912,833 | 11/59 | McGrath | 230—21 |
| 3,045,892 | 7/62 | White | 230—21 |
| 3,065,702 | 11/62 | Dick | 103—42 |

FOREIGN PATENTS

| | | |
|---|---|---|
| 721,565 | 6/42 | Germany. |
| 872,630 | 4/53 | Germany. |

LAURENCE V. EFNER, *Primary Examiner.*